(12) United States Patent
Matos

(10) Patent No.: US 8,164,464 B2
(45) Date of Patent: Apr. 24, 2012

(54) METHOD AND SYSTEM OF AIRCRAFT PILOT ASSESSMENT

(76) Inventor: Jeffrey A. Matos, New Rochelle, NY (US)

( * ) Notice: Subject to any disclaimer, the term of this patent is extended or adjusted under 35 U.S.C. 154(b) by 1066 days.

(21) Appl. No.: 11/388,311

(22) Filed: Mar. 24, 2006

(65) Prior Publication Data

US 2006/0220883 A1  Oct. 5, 2006

Related U.S. Application Data

(60) Provisional application No. 60/664,997, filed on Mar. 24, 2005.

(51) Int. Cl.
| | |
|---|---|
| B60Q 1/00 | (2006.01) |
| G08B 1/08 | (2006.01) |
| G08B 23/00 | (2006.01) |
| G08B 21/00 | (2006.01) |
| A61B 5/00 | (2006.01) |
| G06F 19/00 | (2006.01) |
| G06F 11/30 | (2006.01) |
| G05D 1/00 | (2006.01) |

(52) U.S. Cl. .............. 340/576; 340/439; 340/539.12; 340/573.1; 340/575; 340/945; 600/300; 600/301; 600/302; 700/109; 700/110; 700/111; 701/1; 701/22; 702/182; 702/183

(58) Field of Classification Search ............. 340/439, 340/539.12, 573.1, 575, 576, 945; 600/300, 600/301, 302; 434/29; 700/108, 111; 701/1–22, 701/301; 702/182, 183

See application file for complete search history.

(56) References Cited

U.S. PATENT DOCUMENTS

| | | | | |
|---|---|---|---|---|
| 5,574,641 | A * | 11/1996 | Kawakami et al. ............... 701/1 |
| 5,798,695 | A * | 8/1998 | Metalis et al. ................ 340/576 |
| 6,087,941 | A * | 7/2000 | Ferraz ........................... 340/575 |
| 6,487,500 | B2 * | 11/2002 | Lemelson et al. ............ 701/301 |
| 6,575,902 | B1 * | 6/2003 | Burton .......................... 600/300 |
| 6,734,799 | B2 * | 5/2004 | Munch .......................... 340/576 |
| 6,946,966 | B2 * | 9/2005 | Koenig ......................... 340/576 |
| 6,974,326 | B2 * | 12/2005 | Marple-Horvat ............. 434/236 |
| 6,974,414 | B2 * | 12/2005 | Victor .......................... 600/300 |
| 7,027,621 | B1 * | 4/2006 | Prokoski ...................... 382/118 |
| 7,202,793 | B2 * | 4/2007 | Grace et al. .................. 340/576 |
| 7,301,464 | B2 * | 11/2007 | Coulter ....................... 340/573.7 |

* cited by examiner

*Primary Examiner* — Travis Hunnings
(74) *Attorney, Agent, or Firm* — Eckert Seamans Cherin & Mellott, LLC

(57) ABSTRACT

A method and system are disclosed for assessing the capability of a pilot to operate an aircraft. The system senses the value of at least one operator information parameter for assessing the fitness of the pilot operating the aircraft and at least one aircraft information parameter relating to the position and motion of the aircraft. The operator information parameters include electroencephalogram information, electrocardiogram information, heart rate information, respiratory rate information, eye motion information, eyelid position information, eyelid motion information, expired gas mixture information, blood oxygen content information, blood oxygen saturation information and blood pressure information for the person operating the aircraft, and/or information about actions taken by the person operating the aircraft. Based on these parameters, the system determines if the pilot is capable of properly operating the aircraft and, if not, control of the aircraft is assumed by an alternate source of control which lands the aircraft safely.

34 Claims, 2 Drawing Sheets

METHOD AND SYSTEM OF AIRCRAFT PILOT ASSESSMENT

CROSS-REFERENCE TO RELATED PATENTS AND APPLICATIONS

This application claims priority from U.S. Provisional Application No. 60/664,997, filed Mar. 24, 2005.

The subject matter of this application is related to that disclosed in the U.S. Pat. No. 6,917,863, issued Jul. 12, 2005 and entitled "SYSTEM FOR ASSUMING AND MAINTAINING SECURE REMOTE CONTROL OF AN AIRCRAFT", which patent is incorporated herein by reference. The subject matter of this application is also related to that of the U.S. patent application Ser. No. 10/919,169, filed Aug. 16, 2004, and entitled "METHOD AND SYSTEM FOR CONTROLLING A HIJACKED AIRCRAFT," now U.S. Pat. No. 7,840,317, which patent is also incorporated herein by reference. Further, the subject matter of this application is related to that of the U.S. patent application Ser. No. 11/373,712 filed Mar. 10, 2006, and entitled "METHOD AND APPARATUS FOR DISABLING PILOT CONTROL OF A HIJACKED AIRCRAFT", now U.S. Pat. No. 7,837,143.

BACKGROUND OF THE INVENTION

The present invention relates to apparatus for assuming and maintaining secure control of an aircraft in the event of an emergency condition, such as any incapacity of the pilot(s) or an intended, attempted or actual attack upon the pilot(s) of the aircraft, or upon the aircraft itself.

There are many situations in which an emergency condition may exist on-board an aircraft. For example, the pilot or pilots may be incapacitated due to a sudden loss of cabin pressure, a sudden illness, an intentional biological, chemical or physical attack upon the pilot, a collision, a fire, an explosion or even a missile attack.

In the event of an emergency condition of the type described above, wherein the pilot is unable to properly maintain control the aircraft, the aircraft, crew and passengers can be saved if the aircraft is brought down to a safe landing, guided by some alternate source of aircraft control. The U.S. Pat. No. 6,917,863 discloses a method and system for assuming and maintaining secure remote control of an aircraft in the event of an actual or potential aircraft hijacking or other emergency condition such as incapacity of the pilot(s) due to illness or injury. The U.S. Patent Publication No. US2006/0032978 discloses a number of scenarios which, in the event of a hijacking or other incapacity of the pilot(s), entail an early autopilot/flight control computer control phase, followed by a later remote pilot control phase, whereby personnel on the ground or in another aircraft can assist in bringing the aircraft down for a safe landing at a desired location. The U.S. patent application Ser. No. 11/373,712, (now U.S. Pat. No. 7,837, 143) discloses and claims a method and system for disabling on-board pilot control of a non-fly-by-wire aircraft in the event of an emergency condition.

The present invention relates to methods and systems for determining whether an emergency condition due to operator incapacity exists on-board an aircraft, or some other type of machine. More particularly, the invention concerns a method and system for "pilot assessment": an assessment to determine the moment-to-moment fitness of an aircraft pilot. If the pilot is found to be unfit or unable to control the aircraft, control of the aircraft may be taken away from the pilot.

The present invention is applicable not only to aircraft but also to any situation where a person is responsible for operating a machine, especially where incapacity of the person to operate the machine may result in personal injury or damage to property. In preferred embodiments of the invention, the machine may be any type of transport vehicle, such as an automobile, truck, tank, train or watercraft, in addition to an aircraft.

SUMMARY OF THE INVENTION

A principal object of the present invention is to provide a highly reliable method and system for assessing the capability of a person to operate a machine, such as an aircraft or other transport vehicle.

This object, as well as other objects which will become apparent from the discussion that follows, are achieved, in accordance with the present invention, by providing a method and means for:

(a) Sensing the value of at least one information parameter for assessing the fitness of the person operating the machine. The parameters include (i) one or a combination of: electroencephalogram (EEG) information, electrocardiogram (ECG) information, heart rate information, respiratory rate information, eye motion information, eyelid position information, eyelid motion information, expired gas mixture information, blood oxygen content information, blood oxygen saturation information and blood pressure information for the person operating the machine and/or (ii) information about actions taken by the person operating the machine ($\alpha$) in response to machine conditions which require the attention or intervention of the person, and/or ($\beta$) in response to prompts by the machine intended to assess operator attention and/or competence;

(b) Determining whether the value of the information parameter(s) is/are within, or not within, the range of values that are deemed to be acceptable for operating the machine;

(c) Indicating when the information parameter(s) is/are not within the range of acceptable values, thereby indicating the person's decreased fitness and ability to operate the machine; and (d) In response to this indication, possibly transferring control of the machine to a source of control other than the operator deemed to be performing sub-optimally.

In order to increase the level of certainty that the person operating the machine is or is not fully capable of doing so, it is preferable that two or more of the information parameters noted above be sensed and analyzed. In particular, it is preferable that at least one of (i) information about the operation of the machine and (ii) information about the actions of the first person be sensed and analyzed as well as at least one of the other information parameters; that is, one of the physiologic information parameters.

In the case of an aircraft, as discussed in the aforementioned patent and patent applications, the other source of control may be any one or more of (a) one or more autopilot(s), (b) one or more flight control computer(s), and/or (c) a remote pilot. Hereinbelow, the aforementioned choices (a) through (c) will be referred to as "alternate source of control." Furthermore, the alternate source of control, in the case of a machine other than an aircraft, is intended to refer to any (a) equipment, or (b) person, able to operate the machine in the event that the originally intended operator is impaired.

Hereinbelow, (a) "pilot" is intended to refer to the operator of any machine where improper machine operation may result in personal injury or property damage; (b) "aircraft" is intended to refer to any machine where improper machine operation may result in personal injury or property damage, (c) "off-aircraft" is intended to refer to any location containing a remote pilot, and may also include equipment or personnel capable of assessing pilot competence; "on-board" is intended to refer to locations within, attached to, or in the immediate vicinity of the aircraft, the aircraft defined hereinabove; (d) "emergency" and "emergency condition" are intended to refer to any condition in which the operator of any machine is performing at a sub-optimal level, such that machine operation may result in personal injury or property damage; and (e) "impaired pilot" is intended to indicate a machine operator who is performing at a sub-optimal level, such that machine operation may result in personal injury or property damage.

In one preferred embodiment of the invention, pilot incapacity results in a pilot-initiated takeover, hereinafter called "PITO" (as discussed in U.S. Pat. No. 6,917,863, U.S. Pat. No. 7,840,317, and U.S. Pat. No. 7,837,143 referred to above), wherein the state of emergency is declared either by the pilot himself, or by other personnel or equipment on-board the aircraft. This results in removal of aircraft control from the on-board pilot and transfer of aircraft control to the alternate source of control. The aforementioned removal and transfer may be reversible or irreversible. In this embodiment, once the criteria for pilot incapacity have been satisfied, aircraft control is automatically transferred to the alternate source of control by equipment on-board the aircraft.

In another preferred embodiment of the invention, pilot incapacity may result in a remote-initiated takeover, hereinafter called "RITO" (as discussed in U.S. Pat. No. 6,917,863, U.S. patent application Ser. Nos. 10/919,169, and 11/318, 180), wherein the state of emergency is declared by off-aircraft personnel or equipment. In this embodiment, information about pilot performance is transmitted to an off-aircraft location, where equipment or personnel capable of assessing pilot performance is/are located. The equipment and/or personnel, if deemed appropriate, may issue a signal which causes removal of aircraft control from the on-board pilot and transfer of aircraft control to the alternate source of control. The aforementioned removal and transfer may be reversible or irreversible.

In yet another preferred embodiment of the invention, on-board pilot assessment equipment may define three or more levels of pilot competence. In this embodiment, these levels are:

(a) a high level of on-board pilot competence, wherein the on-board pilot continues to control the aircraft;
(b) an intermediate level of on-board pilot competence, wherein continued on-board pilot control (with or without an increased level of pilot surveillance) may be permitted, or the alternate source of control may be allowed to take control of the aircraft; and
(c) a low level of on-board pilot competence, wherein the alternate source of control is always caused to take control of the aircraft.

The invention would be especially useful on-board an aircraft which contains only one pilot. One such class of aircraft would be military aircraft. Other classes of solo-pilot aircraft include so-called private aircraft used for personal purposes, and commercial vehicles.

The system could be used on any one-pilot aircraft. Furthermore, this system and methodology could be used on aircraft with more than one pilot, by having a duplicate assessment system, one for each pilot.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
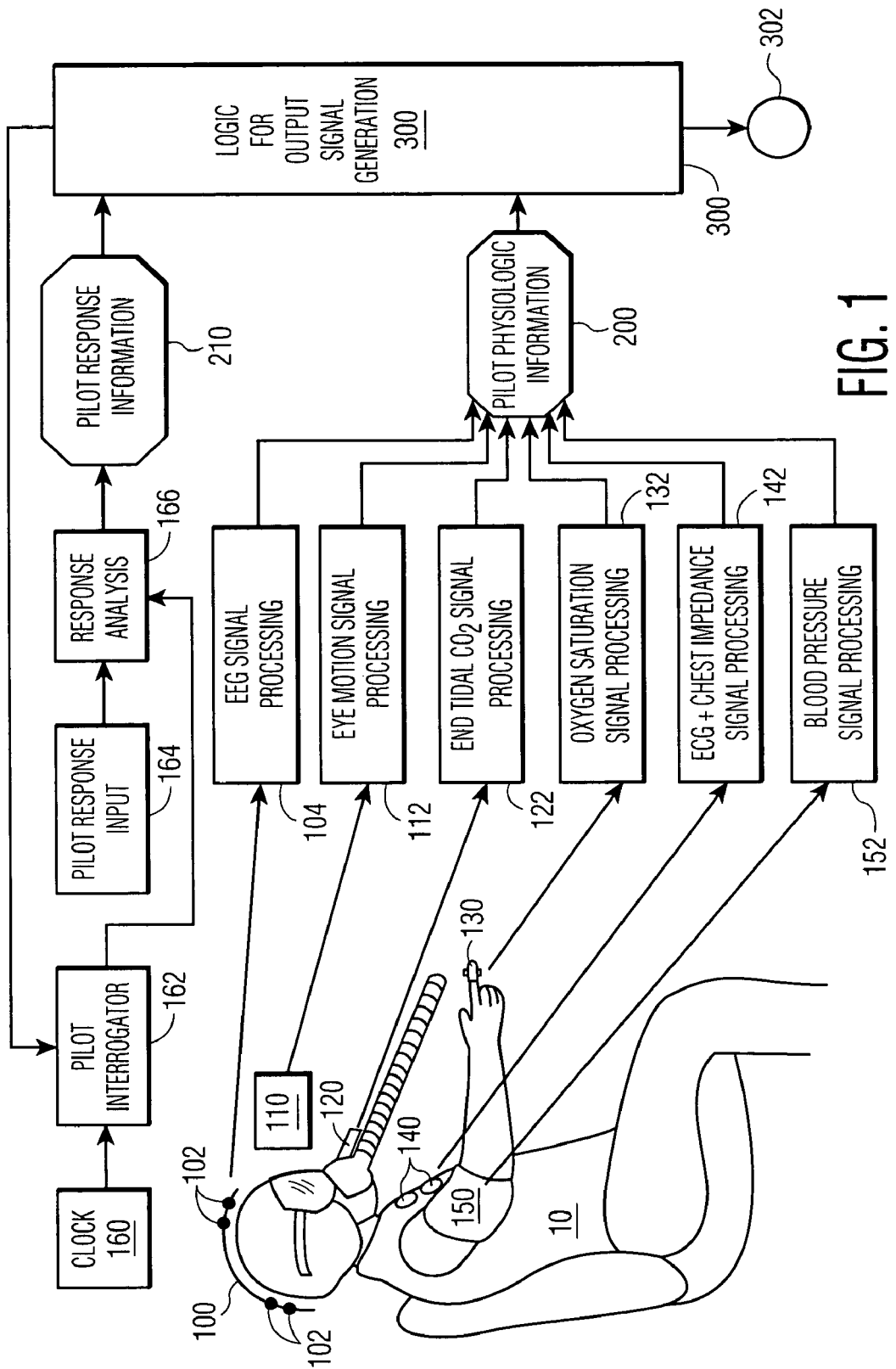
FIG. 1 is a block diagram showing a machine operator (an aircraft pilot) having a plurality of sensors and a pilot interrogator, each connected to an associated signal processor for assessing pilot performance in accordance with the present invention.

If the pilot assessment system, according to the invention, determines that the pilot is, at that moment, not fit to fly, control may be taken from him in one of two ways:
(a) The takeover process may occur on-board the aircraft. The output 302 (see FIG. 1) of the assessment system may be used as a PITO input.
(b) The output(s) of the assessment system may be transmitted to an off-aircraft person (or electronic/computational system) who (which), then makes the decision about appropriateness of a takeover command. If takeover is appropriate, a RITO command is sent to the aircraft.

Logic unit 300 is supplied with pilot fitness information, which is processed therein to assess pilot capacity to fly the aircraft. There are three types of input to 300:
(a) pilot physiologic information (200);
(b) pilot responses to actionable events (210 and 212); and
(c) aircraft information (220, 222 and 224) which may be used to assess pilot performance.

Referring to FIG. 1, six types of pilot information may be collected from sensors attached to or in proximity to pilot 10:
(a) Helmet 100 with electroencephalogram (EEG) electrodes 102 allows monitoring of the pilot's EEG as a means of assessing his state of consciousness. The electrode signals are processed at 104 by means known in the art. Such processing may include digitization, amplification, frequency and spectral analysis. The output of 104 is included in the pilot physiologic information package 200.
(b) Pilot eye motion and eyelid opening is assessed, also as a means of assessing the pilot's state of alertness. Optical scanning equipment 110, as is known in the art, generates eye and/or eyelid information, 110 output signals are processed at 112, and included in the pilot physiologic information package 200.
(c) End-tidal-carbon dioxide is assessed from the pilot's expired gas mixture by sensor 120, as is known in the art. Sensor 120 signals are processed at 122, and included in the pilot physiologic information package 200.
(d) Blood oxygen saturation is assessed by sensor 130. As shown in the figure it is attached to one finger but may, as is known in the art, be attached to locations elsewhere on the pilot's body, including the ear. Sensor 130 signals are processed at 132, and included in the pilot physiologic information package 200.
(e) Electrocardiogram (ECG) information is obtained from ECG electrodes 140. As shown in the figure, 140 are attached to the chest but may, as is known in the art, be attached to one or more arm and/or one or more leg and/or one or more torso locations. Sensors 140 may also be used to monitor pilot respiration, by measuring transthoracic impedance. Sensors 140 signals are processed at 142 and included in the pilot physiologic information package 200.

In addition, information derived from the ECG, e.g. heart rate and heart rate variability may be obtained by 142, and included in the pilot physiologic information package 200.

(f) Blood pressure is assessed by sensor 150. As shown in the figure it is attached to one arm but may, as is known in the art, be attached to locations elsewhere on the pilot's body. Sensor 150 signals are processed at 152, and included in the pilot physiologic information package 200.

The combined outputs of 104, 112, 122, 132, 142 and 152 constitute the pilot physiologic information 200, which serves as an input to logic unit 300. Embodiments of the invention which sense a smaller number of the aforementioned physiologic parameters are possible. Embodiments of the invention which sense additional physiologic parameters (e.g galvanic skin resistance, respiratory volume, etc.) are also possible.

Pilot responses to actionable events include:
(i) responses to a prompt (hereinafter referred to as "responses of the first type") whose sole purpose is to assess pilot responsiveness; and
(ii) responses to an indicator light, sound, screen message, or other pilot warning (hereinafter referred to as "responses of the second type") indicating an aircraft or system condition, parameter or fault which may potentially require pilot action.

Elements 160, 162, 164 and 166 show a means of assessing pilot responses of the first type. Clock 160 periodically generates a prompt which is presented to the pilot by interrogator 162. Element 162 may be a flashing light, a sound producing device, a screen on which a message is displayed and/or a device which produces a tactile sensation for the pilot. The pilot is expected to input a response to this prompt. Element 164, the input device for the pilot response, may be a keyboard, a touch sensitive screen, a sound/voice detecting system, a button or switch, or any other input device which registers a pilot response. The expected response may be a single bit of data (e.g. button is either pressed or not pressed) or it may be more complex (e.g. a specific keyboard entry or spoken word or words is expected). In the latter case, the quality of the response (e.g. the fraction of correct keyboard entries or of correct spoken words) is assessed by response analysis system 166. In addition, the elapsed time between stimulus and response may be assessed, using a signal from interrogator 162 to indicate the start of the stimulus to response interval. Alternatively (not illustrated by the figure) the start of the interval may be indicated by a signal from clock 160 to element 166.

The output of 166 constitutes pilot response information of the first type 210, which serves as an input to logic unit 300. Embodiments of the invention which do not include a means of assessing pilot responses of the first type are possible. Embodiments of the invention which include means for assessing more than one such response are possible. Response assessment systems which use clock information to deliver prompts at non-fixed intervals are possible, as are systems which deliver prompts at fixed intervals. Systems which increase or decrease the prompt frequency in response to other contingencies are possible. For example, if the pilot has responded appropriately to a warning indicator during the last 15 seconds, or if the pilot has appropriately maneuvered the aircraft in a similar time frame, a pilot interrogation which comes due simultaneously or in a similar time frame may be omitted. Another example is as follows: If the pilot responses indicate mild impairment, an increased prompt frequency and response assessment may be caused to occur.

Figure 2:
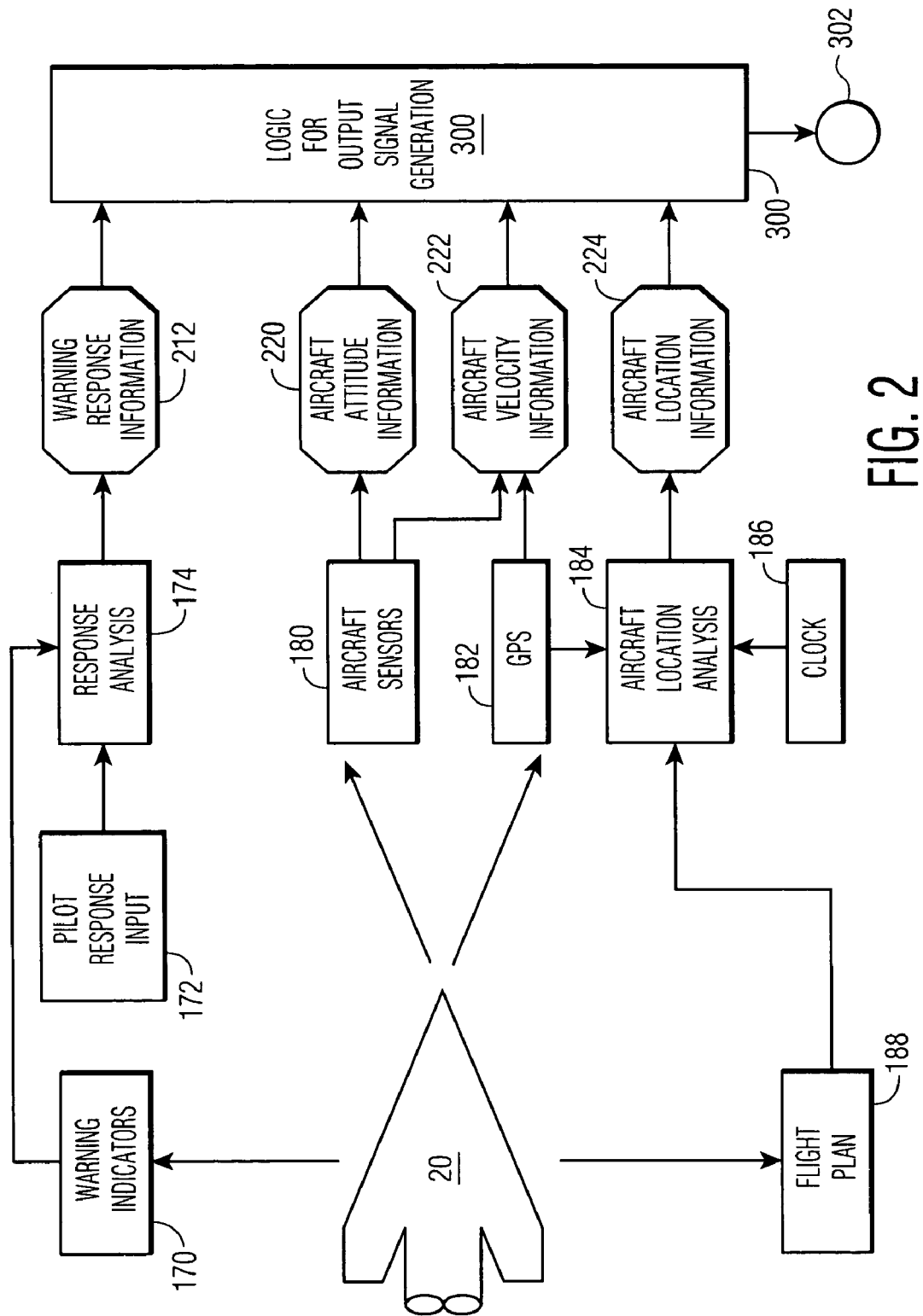
FIG. 2 is a block diagram showing a machine (an aircraft) having a plurality of sensors and other electronic devices, each connected to at least one associated signal processor for assessing pilot performance in accordance with the present invention.

Referring to FIG. 2, elements 170, 172, and 174 show a means of assessing pilot responses of the second type. A system or condition aboard aircraft 20, which may or does require pilot action may be brought to pilot attention by an indicator light, sound, screen message, or other system status or warning indication means 170. The pilot response to the status information or warning, besides being inputted to the appropriate aircraft system requiring the response, is also inputted at 172 to response analysis system 174. Element 174 may assess:
(a) the presence or absence of pilot response;
(b) the appropriateness of the pilot response; and/or
(c) the time from warning indicator start until pilot response. This time interval may be assessed using a signal from warning indicator 170 to indicate the start of the stimulus to response interval.

The output of 174 constitutes warning response information 212, and is one form of pilot fitness information which inputs logic unit 300.

Embodiments of the invention which do not include means for assessing pilot response to warning conditions are possible.

Aircraft information including attitude 220, velocity 222 and location 224 may be used for pilot fitness assessment. Inappropriate pitch, roll, yaw, or rate of change of these parameters, detected by aircraft sensors 180, may constitute an indication that the pilot is incapable of properly flying the aircraft. An inappropriate velocity—either too fast or too slow, may also indicate pilot incapacity. Such velocity information may be obtained from aircraft sensors 180 or derived from Global Positioning Satellite (GPS) information 182. Inappropriate aircraft location may also constitute evidence of pilot incapacity. The appropriateness of aircraft location may be assessed by location analysis system 184 with inputs from each of:
(a) GPS data 182;
(b) clock 186; and
(c) flight plan data 188.
For example:
(a) The aircraft may be located at a point which was not called for by the flight plan; or
(b) The aircraft may be located at a point which was called for by the flight plan, but which was expected to be traversed at a time which is significantly earlier or later than the current instant.

Embodiments of the system which do not sense all of these aircraft parameters are possible, as are embodiments which sense additional parameters (e.g. g-forces), as are embodiments which do not sense any aircraft parameters.

Aircraft information 220, 222 and 224 inputs logic unit 300.

The aforementioned pilot information 200, 210 and 212, and aircraft information 220, 222 and 224 is processed by logic unit 300. Unit 300 may be a microprocessor, part of a microprocessor, a computer or part of a computer. The information processing may include any one of a very large number of possible systems of analysis including:
(a) PITO (if 300 is on-board the aircraft)/RITO (if 300 is off-aircraft) signal is generated if any of a number of critical parameters (e.g. EEG, ECG, roll rate, vertical airspeed, location) is more abnormal than a threshold value;
(b) PITO/RITO signal is generated if certain combinations of parameters are all abnormal (e.g. heart rate greater than 200 and systolic blood pressure less than 65, both for a period of one minute); and
(c) more complex combinations of abnormalities (e.g. heart rate greater than 200 and systolic blood pressure less than 65, both for a period of 30 seconds; and either (i) aircraft roll rate exceeds a critical value or (ii) vertical airspeed exceeds a critical value).

In addition, there may be integration of time and/or location parameters into the takeover analysis decision (e.g. a certain roll rate is acceptable at an altitude of 20,000 feet but not at 200 feet).

Embodiments of the system without logic unit 300, in which no analysis of the data from elements 200-224 is performed, and in which the data is transmitted directly to an off-aircraft monitoring system or person are possible.

The output 302 of logic unit 300 is either:
(a) used as an input to an onboard PITO interface, whereby it constitutes (if indicating the need for PITO) the equivalent of a PITO command;
(b) transmitted to an off-aircraft monitoring system or person, to be used by the monitoring system or person for making a RITO decision; or
(c) used as an input to an onboard PITO interface and transmitted off aircraft. Dual availability of the output of 300 allows off aircraft monitoring (and potential overruling) of a PITO (or non-PITO) decision.

Embodiments of the system in which both the outputs of 200-224 and the output of 300 are transmitted off-aircraft are possible. Any of the aforementioned embodiments may also include the transmission off-aircraft of (a) entirely unprocessed pilot-related data (e.g. pilot keyboard inputs 164 reflecting pilot response to a prompt), and/or (b) partially processed pilot related data (e.g. heart rate or PR interval data, coming from the ECG signal processing 142).

Embodiments of the system with other types of pilot or aircraft input to logic unit 300 are possible.

This system and methodology could be used on aircraft with more than one pilot, by having a duplicate assessment system for each pilot. The outputs from each pilot would serve as inputs for a common, single logic unit 300, which would generate a takeover signal only if both pilots were simultaneously impaired.

Embodiments of the system which (a) do allow, and (b) do not allow the return of control to the pilot are possible. Return of control might be considered after certain abnormalities which triggered the PITO/RITO (e.g. a heart rate or blood pressure condition) have resolved.

Embodiments of the invention are possible in which three or more levels of pilot fitness are defined, to be assessed by automated pilot assessment equipment either on or off of the aircraft (or by a human assessor, on or off aircraft). In this embodiment, in the event of:
(a) a high level of on-board pilot competence (e.g. systolic blood pressure above 88), the on-board pilot continues to control the aircraft;
(b) an intermediate level of on-board pilot competence (e.g. systolic blood pressure 74 to 88), pilot assessment equipment or personnel may allow continued on-board pilot control (with or without an increased level of pilot surveillance), or may cause the alternate source of control to take control of the aircraft; and
(c) a low level of on-board pilot competence (e.g. systolic blood pressure below 74), pilot assessment equipment or personnel cause the alternate source of control to take control of the aircraft.

A preferred method of this embodiment entails on-aircraft generation of a PITO signal in the event of a low level of pilot competence, and causes the assessment of intermediate levels of pilot competence to be made by an off-aircraft human, whose options include:
(a) sending or not sending a RITO signal;
(b) communicating with the pilot; and
(c) causing the pilot assessment system to assess the pilot more frequently or in greater detail.

There has thus been shown and described a novel method and system for assessing the capability of a person to operate a machine which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for assessing the capability of a person to operate an aircraft, said method comprising the steps of:
   (a) sensing the value of an information parameter concerning said person for assessing the fitness of said person to operate said aircraft, said operator information parameter comprising at least one of a physiologic information parameter for said person and an action information parameter about at least one action of said person;
   (b) sensing the value of an information parameter concerning said aircraft, said aircraft parameter comprising at least one of the
      (i) attitude,
      (ii) location,
      (iii) velocity,
      (iv) vertical airspeed,
      (v) rate of change of pitch,
      (vi) rate of change of roll,
      (vii) rate of change of yaw, and
      (viii) g-forces of said aircraft;
   (c) determining whether the values of said operator and said aircraft information paramaters are not within a range of values deemed to be acceptable for said person and said aircraft, respectively, if said person were capable of properly operating said aircraft;
   (d) generating an emergency condition signal when said value of said at least one of said information parameters is not within said range of acceptable values, thereby indicating said person's decreased fitness to operate said aircraft;
   (e) disabling control of said aircraft by said person in response to said signal;
   (f) enabling control of said aircraft by an alternate source of control in response to said signal; and
   (g) landing the aircraft safely by means of said alternate source of control;
   wherein said alternate source of control includes at least one of a flight control system and an off-aircraft human pilot.

2. The method defined in claim 1, wherein said person is selected from the group consisting of a pilot, a co-pilot and a navigator of said aircraft.

3. The method defined in claim 1, wherein step (d) includes indicating said decreased fitness to said person.

4. The method defined in claim 1, wherein said value of said action information parameter is obtained by prompting said person by producing a stimulus for said person, selected from the group consisting of visual stimulation, audible stimulation and tactile stimulation, and wherein step (c) comprises the step of analyzing said value of said action information parameter produced in response to said stimulus.

5. The method defined in claim 1, wherein said value of said action information parameter is obtained by evaluating said person's response to an aircraft condition which requires a response by said person.

6. The method defined in claim 1, wherein said alternate source of control includes at least one of:
(1) automated equipment for operating said aircraft, said automated equipment attached to said aircraft;
(2) automated equipment for operating said aircraft, said automated equipment not attached to said aircraft;
(3) a second operator for operating said aircraft, said second operator located in proximity to said aircraft; and
(4) a second operator for operating said aircraft, said second operator not located in proximity to said aircraft.

7. The method defined in claim 1, wherein said step (d) includes the steps of (1) indicating a first level of decreased fitness when said value of said at least one of said information parameters is within a first range of values, deemed to demonstrate that said person has decreased fitness but that said person's capability remains adequate for operating said aircraft, and (2) indicating a second level of decreased fitness and generating said emergency condition signal when said value of said at least one of said information parameters is within a second range of values, deemed to demonstrate that said person's capability is inadequate for operating said aircraft.

8. The method defined in claim 4, wherein said value of said action information parameter produced in response to said stimulus must occur within a prescribed amount of time to be considered acceptable.

9. The method defined in claim 4, wherein said value of said action information parameter is obtained by prompting said person to perform at least one action selected from the group consisting of: (1) speaking at least one word, (2) typing at least one keystroke on a keyboard, (3) altering the position of at least one switch, and (4) changing the position of at least one body part of said person, and wherein said step (c) consists of analyzing said value to determine whether it is not within the range of values deemed acceptable.

10. The method defined in claim 4, wherein step (a) comprises the step of detecting an electroencephalographic evoked response to said stimulus and wherein step (c) consists of analyzing said evoked response.

11. The method defined in claim 9, wherein said body part is a head of said person and said action of changing said position includes nodding the head.

12. The method defined in claim 4, wherein said visual, audible and tactile stimulation are selected from the group consisting of a flashing light, an audible tone, a mechanical impulse to a body part and an electrical shock to a body part of said person.

13. The method defined in claim 1, wherein said at least one physiologic information parameter is electroencephalogram information.

14. The method defined in claim 1, wherein said at least one physiologic information parameter is at least one of electrocardiogram information, heart rate information and respiratory rate information.

15. The method defined in claim 1, wherein said at least one physiologic information parameter is at least one of eye motion information, eyelid position information and eyelid motion information.

16. The method defined in claim 1, wherein said at least one physiologic information parameter is at least one of expired gas mixture information, blood oxygen content information and blood oxygen saturation information.

17. The method defined in claim 1, wherein said at least one physiologic information parameter is blood pressure information.

18. Apparatus for assessing the capability of a person to operate an aircraft, said apparatus comprising:
(a) means for sensing the value of an information parameter concerning said person for assessing the fitness of said person to operate said aircraft, said operator information parameter comprising at least one of a physiologic information parameter for said person and an action information parameter about at least one action of said person;
(b) means for sensing the value of an information parameter concerning said aircraft, said aircraft information parameter comprising at least one of the at least one of the
(i) attitude,
(ii) location,
(iii) velocity,
(iv) vertical airspeed,
(v) rate of change of pitch,
(vi) rate of change of roll,
(vii) rate of change of yaw, and
(viii) g-forces of said aircraft;
(c) means for determining whether the values of said operator and said aircraft information paramaters are not within the range of values deemed to be acceptable for said person, if said person were capable of properly operating said aircraft;
(d) means for generating an emergency condition signal when said value of said at least one of said information parameters is not within said range of acceptable values, thereby indicating said person's decreased fitness to operate said aircraft;
(e) means for disabling control of said aircraft by said person in response to said signal;
(f) means for enabling control of said aircraft by an alternate source of control in response to said signal; and
(g) means for safely landing the aircraft by said alternate source of control;
wherein said alternate source of control includes at least one of a flight control system and an off-aircraft human pilot.

19. The apparatus defined in claim 18, wherein said person is selected from the group consisting of a pilot, a co-pilot and a navigator of said aircraft.

20. The apparatus defined in claim 18, wherein said means for indicating said decreased fitness of said person includes means for indicating said decreased fitness to said person.

21. The apparatus defined in claim 18, wherein said value of said action information parameter is obtained by prompting said person by producing a stimulus for said person, selected from the group consisting of visual stimulation, audible stimulation and tactile stimulation, and means (c) comprises means for analyzing said value of said action information parameter produced in response to said stimulus.

22. The apparatus defined in claim 18, wherein said value of said action information parameter is obtained by evaluating said person's response to an aircraft condition which requires a response by said person.

23. The apparatus defined in claim 18, wherein said alternate source of control includes at least one of:
(1) automated equipment for operating said aircraft, said automated equipment attached to said aircraft;
(2) automated equipment for operating said aircraft, said automated equipment not attached to said aircraft;

(3) a second operator for operating said aircraft, said second operator located in proximity to said aircraft; and (4) a second operator for operating said aircraft, said second operator not located in proximity to said aircraft.

24. The apparatus defined in claim 18, wherein said means (d) for indicating said decreased fitness of said person includes means for (i) indicating a first level of decreased fitness when said value of said at least one of said information parameters is within a first range of values deemed to demonstrate that said person has decreased fitness but that said person's capability remains adequate for operating said aircraft, and (ii) indicating a second level of decreased fitness and generating said emergency condition signal when said value of said at least one of said information parameters is within a second range of values deemed to demonstrate that said person's capability is inadequate for operating said aircraft.

25. The apparatus defined in claim 21, wherein said value of said action information parameter produced in response to said stimulus must occur within a prescribed amount of time to be considered acceptable.

26. The apparatus defined in claim 21, wherein said value of said action information parameter is obtained by prompting said person to perform at least one action selected from the group consisting of: (1) speaking at least one word, (2) typing at least one keystroke on a keyboard, (3) altering the position of at least one switch, and (4) changing the position of at least one body part of said person, and wherein means (c) comprises means for analyzing said value to determine whether it is not within the range of values deemed acceptable.

27. The apparatus defined in claim 21, wherein means (a) comprises means for detecting an electroencephalographic evoked response to said stimulus and wherein means (c) comprises means for analyzing said evoked response.

28. The apparatus defined in claim 26, wherein said body part is a head of said person and said action of changing said position includes nodding the head.

29. The apparatus defined in claim 21, wherein said visual, audible and tactile stimulation are selected from the group consisting of a flashing light, an audible tone, a mechanical impulse to a body part and an electrical shock to a body part of said person.

30. The apparatus defined in claim 18, wherein said at least one physiologic information parameter is electroencephalogram information.

31. The apparatus defined in claim 18, wherein said at least one physiologic information parameter is at least one of electrocardiogram information, heart rate information and respiratory rate information.

32. The apparatus defined in claim 18, wherein said at least one physiologic information parameter is at least one of eye motion information, eyelid position information and eyelid motion information.

33. The apparatus defined in claim 18, wherein said at least one physiologic information parameter is at least one of expired gas mixture information, blood oxygen content information and blood oxygen saturation information.

34. The apparatus defined in claim 18, wherein said at least one physiologic information parameter is blood pressure information.

* * * * *